July 19, 1932.  W. J. HALE  1,868,140
EFFECTING ORGANIC REACTIONS IN AQUEOUS
MEDIA AT HIGH TEMPERATURES
Filed Sept. 1, 1926
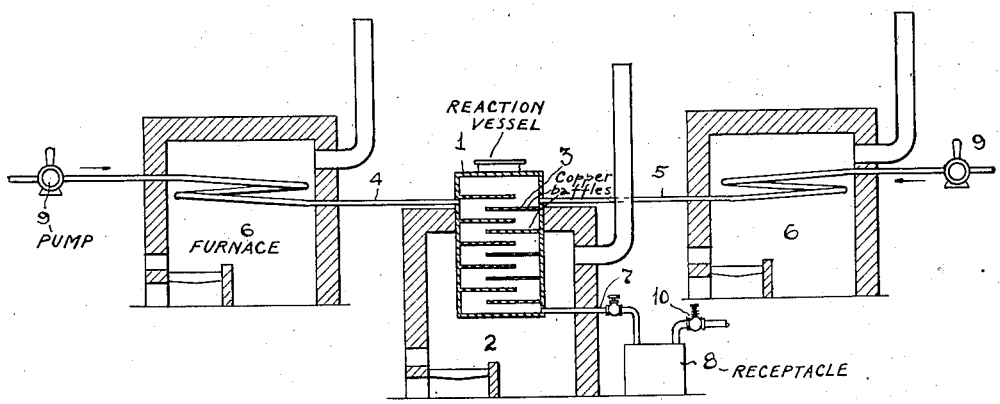
INVENTOR.
William J. Hale
BY
Fay, Oberlin + Fay
ATTORNEYS.

Patented July 19, 1932

1,868,140

UNITED STATES PATENT OFFICE

WILLIAM J. HALE, OF MIDLAND, MICHIGAN, ASSIGNOR TO THE DOW CHEMICAL COMPANY, OF MIDLAND, MICHIGAN, A CORPORATION OF MICHIGAN

EFFECTING ORGANIC REACTIONS IN AQUEOUS MEDIA AT HIGH TEMPERATURES

Application filed September 1, 1926. Serial No. 132,986.

This invention relates to procedure for effecting organic chemical reactions in aqueous media at high temperatures and pressures, and more particularly the preparation of hydroxylic derivatives of aromatic hydrocarbons, and it is among the objects of the invention to provide improved procedure whereby the reaction may be directed to the formation of compounds desired rather than to undesired by-products. Other objects and advantages will appear as the description proceeds.

To the accomplishment of the foregoing and related ends, the invention, then, consists of the features hereinafter fully described, and particularly pointed out in the claims, the following description and the annexed drawing setting forth but a few of the various ways in which the principle of the invention may be applied.

In said annexed drawing:—

The sole figure is a diagrammatic, sectional view of an apparatus suitable for carrying out the invention.

In chemical operations at high temperatures and pressures, (i. e. temperatures in excess of 200° C. and pressures corresponding with the tension of aqueous vapor at these temperatures) it is a practice to first bring the reacting components together, and then forward the mixture through some type of pre-heating system, and thence to a reaction chamber.

The apparatus devised by J. W. Aylsworth (U. S. Patent 1,213,143), and its use for phenol manufacture (U. S. Patent 1,213,142), provides a system of heating the reacting components, chlorobenzene and aqueous caustic soda, supplied under high pressure into a tubular system, while withdrawing a portion of the heated mixture and forcing this hot portion into the mixture of in-coming components as they enter the tubular system. Thereby a certain amount of pre-heat and a better mixture of all ingredients is obtained.

It is now found that such manner of effecting the preheating of organic chemical compounds introduces undesirable complications. Whatever heating of the mixed components precedes that of the main reaction chamber leads naturally, during this stage, to the formation of small quantities of the products of the main reaction itself, and the presence of such products of the main reaction in small quantities makes possible further certain secondary reactions between them and the larger concentrations of original components as they all together pass into higher and higher ranges of temperature in transit through the system. Furthermore, all organic chemical compounds present as such in a system characterized by a gradual rise of temperature must be subject more and more to possible reactions with foreign products introduced by any one of the reagents by attack upon walls or material of the containing vessels.

In particular, we shall cite the possible reactions that occur in the process as outlined by Aylsworth for the manufacture of phenol from chlorobenzene.

In accordance with that process, a mixture of chlorobenzene and a proportion of two and one-fourth molecules of caustic soda in dilute aqueous solution is pumped into an iron tubular system subjected to heat, and brought gradually to a temperature of 340° to 390° C. before discharging the resultant sodium phenate and sodium chloride formed.

Among the reactions which can occur are the following:—

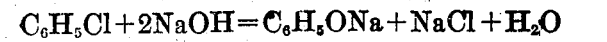
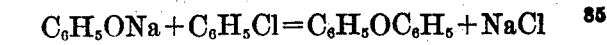
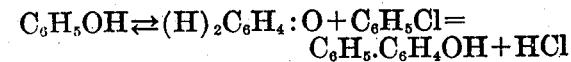
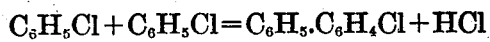
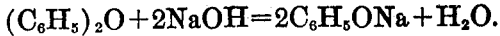

$C_6H_5Cl + 2NaOH = C_6H_5ONa + NaCl + H_2O$ $C_6H_5ONa + C_6H_5Cl = C_6H_5OC_6H_5 + NaCl$ $C_6H_5OH \rightleftharpoons (H)_2C_6H_4 : O + C_6H_5Cl = C_6H_5.C_6H_4OH + HCl$ $C_6H_5Cl + H_2 = C_6H_6 + HCl$ $C_6H_5H + C_6H_5Cl = C_6H_5.C_6H_5 + HCl$ $C_6H_5Cl + C_6H_5Cl = C_6H_5.C_6H_4Cl + HCl$ $(C_6H_5)_2O + 2NaOH = 2C_6H_5ONa + H_2O.$ It is known that certain metals at higher temperatures replace hydrogen from water and form the corresponding metallic oxides. Such a metal is iron, and the presence of caustic soda in water in contact with the heated iron materially aids this reaction. I have found that dilute caustic soda when passed through hot iron tubes at temperatures above 300° C. yields a continuous supply of hydrogen, which may be burnt in a steady flame at the exit end of the system.

When we consider the reaction mixture of chlorobenzene and dilute caustic alkali, together with free hydrogen made possible by the use of iron vessels as containers for the material, and at a temperature in the neighborhood of 300°, we are confronted with a number of the reactions illustrated above. The hydrogen in the presence of metallic iron reacts slightly upon a portion of the chlorobenzene and free benzene is obtained. Furthermore, free benzene at these higher temperatures reacts to a slight extent with chlorobenzene and diphenyl is produced. Under the catalytic action of metals at the higher temperatures, chlorobenzene is found to react with itself, yielding small quantities of chloro-diphenyl. Again, phenol at the higher temperatures in an aqueous solution is transformed into tautomeric or keto form, and a portion of this effects a condensation with chlorobenzene to give directly ortho and para-hydroxy diphenyl. Especially is this latter reaction apparent in the presence of a favorable catalyst, such as copper.

In such process there is always encountered a conversion of a material proportion of the chlorobenzene into tarry products which are waste.

The selection of proper material for supplying these ingredients, chlorobenzene and dilute caustic alkali solution, is beset with difficulties. Copper may advantageously be employed as a container for the dilute caustic solution, as it has been found to be of little action upon such solution within the range of temperature of 250° to 350° C. Nickel would be better in some respects. Iron vessels may be used in supplying chlorobenzene as no action here has been noted.

For the supply of water or dilute caustic alkali into the reaction chamber, copper tubes should be used. It may be noted that iron tubes, when serving in such capacity, gradually acquire an interior coating of magnetic iron oxide, but this product has a tendency to separate from time to time from the walls of the tubes, and thus fresh surfaces of metallic iron are continuously brought in contact with the hot water and such tubes sooner or later become unfit for further use in high pressure systems.

It is now found that organic chemical reactions at high temperatures and pressures, when involving aqueous media, are most highly favored by selecting the proper metallic pipes or conduits for aqueous reactants in order that a minimum of the action between the hot water and the metal may arise. The low specific heats of most organic chemical compounds make it more or less unnecessary to supply heat to these compounds while in transit to a reaction chamber. The high specific heat of water, however, requires that this substance be brought to the necessary reaction temperature or slightly above before it is charged into the reaction chamber; any excess of heat supplied to the water will be taken out by transference to the organic compound on its entrance to the chamber. Again, when the organic compound is not attacked by water alone, such as is the case between chlorobenzene and water, it may be recommended that the chlorobenzene and water as a mixture be supplied to the reaction chamber through hot copper coils and the molten or highly concentrated caustic alkali brought directly to the same chamber by another conduit.

At all times a careful regulation of the pressures under which each of the ingredients is supplied to the reaction vessel is important in order to insure the intimate mixing of said ingredients in the reaction zone and in the proper molecular proportions.

Furthermore, the reaction chamber should be supplied with a particular catalyst capable of hastening the reaction decidedly; thus, in the case of hydrolysis of chlorobenzene and caustic alkali, nothing has been found superior to metallic copper. The reaction chamber, therefore, for such process should be filled with bright metallic copper plates, and the hydrolysis of the chlorobenzene will be found to proceed with highest speed. Three to five minutes will be sufficient time in comparison with the fifteen minutes to one hour numbered in all previous processes. The catalytic action of the copper in effecting higher production of diphenyloxide and hydroxy diphenyl is reduced, likewise, to a minimum by reason of the shorter time period.

In accordance with my invention, the reaction components instead of being mixed and brought up to reaction temperature together are brought separately and provided with the proper amount of heat required for control of the reaction.

In the drawing, the reference numeral 1 designates a reaction vessel arranged to be heated by any desired means, as a furnace 2, or instead of actively applying heat at this point, when preferred the temperature of the materials supplied may be simply maintained, as by merely bathing the vessel in products of combustion sufficient to prevent heat loss or by jacketing the vessel with heat-insulation sufficient for this purpose. The vessel 1 is supplied with exposed copper surfaces, usually more than afforded by the walls alone, and advantageously in the form of strips or of baffles 3. Pipes 4 and 5 empty into the vessel and one at least of these with its heating coil is of copper. Advantageously both of the pipe coils are provided with furnaces or the like 6, so that one or both can be heated as desired. Discharge from the vessel is provided by a pipe 7 leading to any desired point, for example a receptacle 8. Pumps 9 may be provided to feed the materials through the pipes 4 and 5.

As an illustration, where applied to the hydrolysis of chlorobenzene by dilute caustic alkali, the following may be noted:—

A supply of chlorobenzene is pumped through a heating coil 4 of iron or other material into copper or copper lined reaction chamber 1 held at 300° to 375° C. Through a second coil of copper 5 heated to somewhat over 300° C. there is pumped an equivalent of caustic alkali two and one-fourth times molecular quantity of the chlorobenzene and in five to ten per cent aqueous solution. Interaction between these two components proceeds immediately upon their coming in contact with each other, and the resultant mixture is run out through exit tube 7 of iron or other metal into a receptacle 8 supplied with a pressure release device 10. From this final mixture phenol may be separated in any usual or preferred way.

As an alternative to the procedure above outlined, a much more concentrated caustic alkali solution or molten caustic alkali may be supplied directly to the reaction chamber through an iron or copper coil 4 heated to 300° to 375° C., and a mixture of the chlorobenzene and the requisite quantity of water may be pumped through a copper coil 5 into the reaction chamber, the components in the reaction chamber attaining the same relative proportions and concentrations as mentioned in the previous example. The effluent liquors are led off at once into containers provided with pressure release devices.

Using a plurality of feed conduits to the reaction vessel, one or more or all of these may be heated, the requisite temperature for reaction thus being supplied and ready at the time the reaction components are brought together. For instance, it becomes possible to employ a reaction chamber having separate conduits capable of separably supplying water, chlorobenzene, and fused or highly concentrated caustic alkali, these respective components being fed to the reaction chamber, the heat requisite being supplied to any or all of the conduits such that the components when brought together have thus the proper temperature and immediately react.

Sulphonated aromatic hydrocarbons, for example, may also be particularly advantageously handled in accordance with the principle of this invention.

Other modes of applying the principle of the invention may be employed, change being made as regards the details disclosed, provided the steps or means stated in the following claims or the equivalent of such be employed.

I therefore particularly point out and distinctly claim as my invention:—

1. A process for making hydroxylic derivatives of aromatic hydrocarbons, which includes bringing together under separate pressure supplies as reaction components a reactable aromatic hydrocarbon derivative and a compound of an alkali metal capable of effecting hydrolysis, at least one of such components having sufficient heat for the reaction.

2. A process for making hydroxylic derivatives of aromatic hydrocarbons, which includes bringing together under separate pressure supplies as reaction components a halogenated aromatic hydrocarbon and a compound of an alkali metal capable of effecting hydrolysis, the last-named compound having sufficient heat for the reaction.

3. A process for making hydroxylic derivatives of aromatic hydrocarbons which includes bringing together under separate pressure supplies as reaction components a halogenated aromatic hydrocarbon and a solution of a caustic alkali, substantially without admixed hydrogen, at least one of such components being previously heated to reaction temperature.

4. A process for making hydroxylic derivatives of aromatic hydrocarbons, which includes bringing together under separate pressure supplies as reaction components a halogenated aromatic hydrocarbon and a solution of caustic alkali, substantially without admixed hydrogen, such alkali being previously heated to reaction temperature.

5. A process for making hydroxylic derivatives of aromatic hydrocarbons, which includes separately heating a halogenated aromatic hydrocarbon and a compound of an alkali metal capable of effecting hydrolysis, and bringing these together under separate pressure supplies substantially without admixed hydrogen.

6. A process for making hydroxylic derivatives of aromatic hydrocarbons, which includes separately heating a halogenated aromatic hydrocarbon and a solution of a caustic alkali, and bringing these together under separate pressure supplies, substantially without admixed hydrogen.

7. A process for making hydroxylic derivatives of aromatic hydrocarbons, which includes bringing together under separate pressure supplies as reaction components a reactable aromatic hydrocarbon derivative and a compound of an alkali metal capable of effecting hydrolysis, in the presence of copper, at least one of such components being previously heated to reaction temperature.

8. A process for making hydroxylic derivatives of aromatic hydrocarbons, which includes bringing together under separate pressure supplies as reaction components a halogenated aromatic hydrocarbon and a compound of an alkali metal capable of effecting hydrolysis, in the presence of copper, the alkali metal compound being previously heated to reaction temperature.

9. A process for making hydroxylic derivatives of aromatic hydrocarbons, which includes bringing together under separate pressure supplies as reaction components a halogenated aromatic hydrocarbon and a compound of an alkali metal capable of effecting hydrolysis, in the presence of copper, the alkali metal compound being previously heated to reaction temperature without exposure to iron.

10. A process for making hydroxylic derivatives of aromatic hydrocarbons, which includes bringing together under separate pressure supplies as reaction components a halogenated aromatic hydrocarbon and an aqueous solution of a caustic alkali, in the presence of copper, at least one of such components being previously heated to reaction temperature.

11. A process for making hydroxylic derivatives of aromatic hydrocarbons, which includes bringing together under separate pressure supplies as reaction components a halogenated aromatic hydrocarbon and a compound of an alkali metal capable of effecting hydrolysis, in the presence of copper, the alkali metal compound being previously heated to reaction temperature.

12. A process for making hydroxylic derivatives of aromatic hydrocarbons, which includes bringing together under separate pressure supplies as reaction components a halogenated aromatic hydrocarbon and an aqueous solution of a caustic alkali, in the presence of copper, such alkali being previously heated to reaction temperature without exposure to iron.

13. A process for making phenol, which includes bringing together under separate pressure supplies as reaction components chlorobenzene and an aqueous solution of caustic soda, substantially without admixed hydrogen, at least one of such components being previously heated to reaction temperature.

14. A process for making phenol, which includes bringing together under separate pressure supplies as reaction components chlorobenzene and an aqueous solution of caustic soda, substantially without admixed hydrogen, such solution being previously heated to reaction temperature.

15. A process for making phenol, which includes bringing together under separate pressure supplies as reaction components chlorobenzene and an aqueous solution of caustic soda, substantially without admixed hydrogen, such solution being previously heated to reaction temperature without exposure to iron.

16. A process for making phenol, which includes bringing together under separate pressure supplies as reaction components chlorobenzene and an aqueous solution of caustic soda, substantially without admixed hydrogen, such solution being previously heated to about 350° C.

17. A process for making phenol, which includes bringing together under separate pressure supplies as reaction components chlorobenzene and an aqueous solution of caustic soda, substantially without admixed hydrogen, such solution being previously heated to about 350° C. without exposure to iron.

18. A process for making phenol, which includes bringing together under separate pressure supplies as reaction components chlorobenzene and an aqueous solution of caustic soda, substantially without admixed hydrogen, in the presence of copper, at least one of such components being previously heated for reaction temperature.

19. A process for making phenol, which includes bringing together under separate pressure supplies as reaction components chlorobenzene and an aqueous solution of caustic soda, in the presence of copper, the caustic soda solution being heated to about 350° C.

20. A process for making phenol, which includes bringing together under separate pressure supplies as reaction components chlorobenzene and an aqueous solution of caustic soda in the presence of copper, the caustic soda solution being previously heated to about 350° C. without exposure to iron.

21. A process for making phenol, which includes heating under pressure an aqueous alkali solution in a copper-lined tubular vessel to a temperature between 300° and 375° C., and supplying the heated alkali to a reaction chamber having a copper lining and maintained likewise at a high temperature, supplying thereto chlorobenzene in proper proportion through a second heated tubular system, whereby an immediate hydrolysis of such chlorobenzene ensues without production of by-product, and drawing off the resulting sodium phenate liquor at once through a pressure release mechanism.

22. A process for making phenol, which includes heating under pressure a mixture of chlorobenzene and water in a copper lined vessel to a temperature between 300° and 375° C. and supplying the same to a reaction chamber having a copper lining maintained at the same high temperature, supplying thereto a constant quantity of caustic alkali through a second heated tubular vessel of copper, whereby immediate hydrolysis of the chlorobenzene ensues without production of by-products, and drawing off the resulting sodium phenate liquor.

23. A process for making phenol, which includes heating under pressure a steady supply of water in a copper lined tubular vessel at a temperature of 300° to 375° C. and supplying the same to a reaction chamber having a copper lining and maintained at the same high temperature, supplying a constant quantity of chlorobenzene in proportion through a second tubular vessel, also supplying to the reaction chamber a constant quantity of caustic alkali in proper proportion through a third heated tubular vessel, whereby a simple hydrolysis of the chlorobenzene ensues without production of by-products, and drawing off the resulting sodium phenate liquor at once through a pressure release mechanism.

Signed by me this 20th day of August, 1926.

WILLIAM J. HALE.